(12) United States Patent
Agardh et al.

(10) Patent No.: US 9,426,786 B2
(45) Date of Patent: Aug. 23, 2016

(54) SHARING TRANSMISSION INTENTIONS IN WIRELESS NETWORKS FOR CSMA OPTIMIZATION

(71) Applicant: Sony Corporation, Tokyo (JP)

(72) Inventors: Kåre Agardh, Rydebäck (SE); Vanja Plicanic Samuelsson, Lund (SE); Rickard Ljung, Helsingborg (SE); Peter C. Karlsson, Lund (SE)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 14/284,769

(22) Filed: May 22, 2014

(65) Prior Publication Data

US 2015/0341909 A1 Nov. 26, 2015

(51) Int. Cl.
*H04W 72/04* (2009.01)
*H04W 74/08* (2009.01)

(52) U.S. Cl.
CPC .......... *H04W 72/04* (2013.01); *H04W 74/0816* (2013.01)

(58) Field of Classification Search
CPC .......................... H04W 72/04; H04W 74/0816
See application file for complete search history.

(56) References Cited

U.S. PATENT DOCUMENTS

| | | | |
|---|---|---|---|
| 5,515,379 A | 5/1996 | Crisler et al. | |
| 5,644,576 A | 7/1997 | Jacques et al. | |
| 2003/0060207 A1 | 3/2003 | Sugaya et al. | |
| 2010/0135264 A1* | 6/2010 | Nilsson | H04W 74/08 370/338 |
| 2013/0155905 A1* | 6/2013 | Sampath | H04W 48/16 370/255 |
| 2013/0195036 A1* | 8/2013 | Quan | H04W 72/04 370/329 |
| 2014/0092860 A1* | 4/2014 | Kneckt | H04W 72/1205 370/329 |
| 2014/0177605 A1* | 6/2014 | Kwon | H04L 1/00 370/336 |
| 2015/0124677 A1* | 5/2015 | Asterjadhi | H04L 1/0025 370/311 |
| 2015/0124776 A1* | 5/2015 | Lee | H04W 76/026 370/331 |

FOREIGN PATENT DOCUMENTS

DE     10 2011 077806 A1    12/2012

OTHER PUBLICATIONS

Notification of Transmittal of The International Search Report and The Written Opinion of the International Searching Authority, or the Declaration, PCT/JP2014/005783, Date of Mailing: Jul. 2, 2015, 11 pages.

* cited by examiner

*Primary Examiner* — Albert T Chou
(74) *Attorney, Agent, or Firm* — Myers Bigel & Sibley, P.A.

(57) ABSTRACT

A method by a device of communicating with a wireless access point is disclosed. The method includes receiving information that characterizes intended future transmissions of one or more other devices. The method includes controlling transmission of a packet to the wireless access point based on the information. Related access points, methods by devices, and devices are disclosed.

17 Claims, 8 Drawing Sheets

Opportunistic usage of time / spectrum
Knowledge is shared between devices to avoid CSMA collisions

SHARING TRANSMISSION INTENTIONS IN WIRELESS NETWORKS FOR CSMA OPTIMIZATION

TECHNICAL FIELD

The present invention relates to wireless communication systems and more particularly to optimization of communications in a wireless communication system.

BACKGROUND

Wireless networks may use standards such as IEEE 802.11a/g using the Carrier Sense Multiple Access (CSMA) protocol for probabilistic access to a shared medium. When using the CSMA protocol, a device may use feedback from a receiver to determine whether another transmission is in progress before initiating a transmission. Each device must "listen" before transmitting. The device may try to detect the presence of a carrier wave from another device before attempting to transmit. If a carrier from another device is sensed, the station waits for the transmission in progress to finish before initiating its own transmission. In other words, CSMA is based on the principle "sense before transmit" or "listen before talk". A collision may occur on the shared medium when multiple devices attempt to use the medium at the same time. A collision detection scheme may be used to improve CSMA performance by terminating a transmission as soon as a collision is detected, thus shortening the time required before a retry can be attempted. A collision avoidance scheme may be used to improve the performance of CSMA by attempting to be less "greedy" on the channel. If the channel is sensed busy before transmission, then the transmission is deferred for a "random" time interval. This reduces the probability of collisions on the channel.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Various embodiments of the present disclosure are directed to a method by a device of communicating with a wireless access point. The method includes receiving information that characterizes intended future transmissions of one or more other devices and controlling transmission of a packet to the wireless access point based on the information. The information that characterizes the intended future transmissions may be directly received from the one or more other devices. The information that characterizes the intended future transmissions of the one or more other devices may be received from the wireless access point.

Some embodiments of the present disclosure may include receiving information from the access point containing an aggregated information set characterizing future transmissions of a plurality of other devices. The method may further include controlling transmission of the packet based on the aggregated information set characterizing future transmissions of the plurality of other devices. The aggregated information set may include an indication of channels that will be used for future transmission by the plurality of other devices. The method may include selecting a channel among a plurality of channels for transmission of the packet based on the information set. The method may include selecting the channel to be different from the channels indicated by the aggregated information set.

According to some embodiments described herein, the aggregated information set may include an indication of time slots that will be used for future transmission by the plurality of other devices. The method may include controlling timing of transmission of the packet on a same one of the channels indicated by the aggregated information set but in a time slot selected based on the time slots indicated by the aggregated information set.

According to some embodiments, the aggregated information set includes an indication of respective time offsets from a time event that will be used to control timing of each of the future transmissions by the plurality of other devices. The method may include controlling timing of transmission of the packet based on the time offsets indicated by the aggregated information set.

According to some embodiments, the aggregated information set may include an indication of respective channels related to time offsets used by each of the future transmissions by the plurality of other devices. The method may include transmitting the packet on a channel in a time slot that does not overlap the respective channels related to the time offsets indicated by the aggregated set.

According to some embodiments, the aggregated information set characterizing future transmissions includes an indication of periodic time intervals that will be used for future transmission by the plurality of other devices. The aggregated information set may include an indication of respective channels related to the periodic time interval. The method may include transmitting the packet on a channel in a time slot that does not overlap the respective channels related to the periodic time intervals indicated by the aggregated set.

According to some embodiments, the method may include listening for an absence of traffic from the one or more other devices. The method may further include transmitting, to the wireless access point, information that characterizes one or more future transmissions of a packet from the device, in response to determining the absence of traffic. The information that characterizes one or more future transmissions of packets may be transmitted in an uplink packet header. The information that characterizes one or more future transmissions of packets may include an indication of a channel in a given time slot in which the one or more future transmissions will occur. The information that characterizes one or more future transmissions of packets may include an indication of a time offset from the present time in which the one or more future transmissions will occur. The information characterizing the one or more future transmissions of packets may include an indication of periodic time intervals in which the one or more future transmission will occur. In some embodiments, listening for an absence of traffic from the one or more other devices and transmitting the information that characterizes one or more future transmissions may be based on carrier sense multiple access (CSMA) protocol.

It will be understood that various embodiments were described above in terms of methods by a device communicating with a wireless access point. Analogous embodiments may be provided for a device, such as a mobile device, according to any of the embodiments described herein. For example, a device may include a processor and media accessing system that runs on the processor and is configured to perform operations such as receiving information that characterizes intended future transmissions of other devices, and controlling transmission of a packet to the wireless access point based on the information.

Some embodiments described herein may be directed to an access point for controlling access to a wireless medium in a wireless communication network. The access point may perform operations including receiving, from each of a plurality of devices, information that characterizes intended future transmissions. The access point may further perform operations including aggregating the information that characterizes the intended future transmissions from each of the plurality of devices to produce an aggregated information set characterizing future transmissions of the plurality of devices and transmitting, to at least one of the plurality of devices, aggregated information based on the aggregated information set characterizing future transmissions of the plurality of devices.

According to some embodiments as described herein, transmitting aggregated information may include determining one or more free channels that are not channels in which the plurality of devices intend to transmit. Transmitting aggregated information may also include transmitting an indication of the one or more free channels to at least one of the plurality of devices.

According to some embodiments as described herein, transmitting aggregated information may include determining a free combination of channel and time slot based on the one or more combinations of channels and time slots upon which the plurality of devices intend to transmit in the future. Transmitting aggregated information may also include transmitting an indication of the free combination of channel and time slot to at least one of the plurality of devices.

Analogous embodiments may also be provided for a computer program or a computer program product according to any of the embodiments described herein. For example, a computer program may include a tangible computer readable storage medium comprising computer readable program code embodied in the medium that when executed by at least one processor of a computer system causes the computer system to perform operations such as receiving information that characterizes intended future transmissions of other devices, and controlling transmission of a packet to the wireless access point based on the information. In some embodiments, the computer readable program code embodied in the medium that when executed by at least one processor of a computer system causes the computer system to perform operations such as receiving information that characterizes intended future transmissions, aggregating the information that characterizes the intended future transmissions from each of the plurality of devices to produce an aggregated information set characterizing future transmissions of the plurality of devices, and transmitting aggregated information based on the aggregated information set characterizing future transmissions of the plurality of devices.

Other electronic devices, methods, and/or computer program products according to embodiments of the invention will be or become apparent to one with skill in the art upon review of the following drawings and detailed description. It is intended that all such additional electronic devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

Various embodiments described herein can provide systems, methods and devices for accessing a wireless medium. Various embodiments described herein may be used, in particular with mobile devices such as mobile telephones, internet-enabled devices, or other devices to communicate with a wireless access point.

Various embodiments will now be described more fully hereinafter with reference to the accompanying drawings, in which examples of various embodiments are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments are described herein in the context of operating in a mobile device. It will be understood, however, that the present invention is not limited to such embodiments and may be embodied generally in any type of device that may communicate with a wireless access point. Additionally, it will be understood that although the present disclosure is described in terms of a wireless communication medium, similar principals and concepts may be applied to a wired communication medium.

Figure 1:
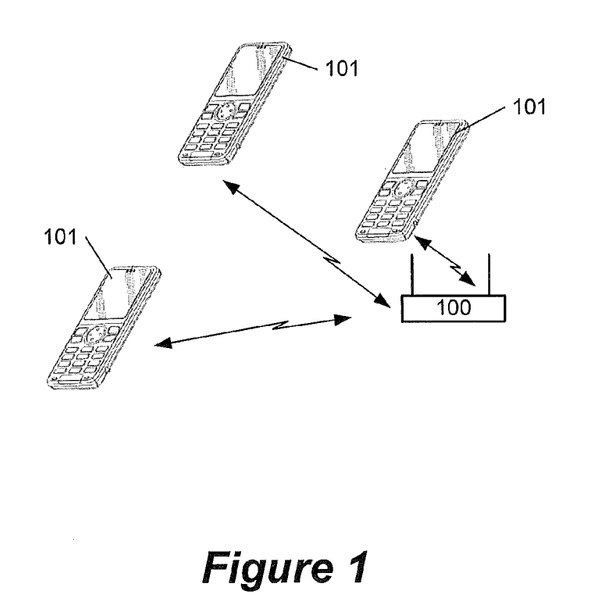
FIG. 1 illustrates devices communicating with the wireless access point.

FIG. 1 is a simplified block diagram of a wireless communication system. As shown in FIG. 1, a wireless access point 100 may be in communication with a plurality of devices 101. Communication between the wireless access point 100 may include downlink/downstream communication to the device 101 and/or uplink/upstream communication from the device 101. As used herein, a device 101 can include any device that communicates with a wireless access point, and may include, but is not limited to, a mobile device ("cellular" telephone), internet-enabled devices, laptop/portable computer, pocket computer, hand-held computer, and/or desktop computer. As used herein, a wireless access point 100 may be another device 101 including wireless access point functionality as described herein, router, gateway, bridge, switch, hub, repeater, wireless hotspot, base station, femtocell, macrocell, and/or picocell base station, and/or an eNodeB. The wireless access point 100 may be wireless communicating over an air interface or may use wireline communication.

As used herein, a wireless access point 100 may be used in infrastructure mode, ad hoc/peer-to-peer mode, mesh networking mode, and/or in other topologies. The wireless access point 100 may be used in infrastructure mode as a device for central access such that devices may communicate indirectly in a communication network. A wireless access point 100 may be used in "ad hoc" mode in a peer-to-peer network such that devices including the wireless access point may communicate directly with one another. In other words, the wireless access point may include functionality to behave as a node and/or peer in a peer-to-peer network. The wireless access point may include coordinating responsibilities, group owner responsibilities, and/or client responsibilities for the peer-to-peer network. Other devices in the peer-to-peer network may or may not be aware of the aforementioned responsibilities of the wireless access point.

Figure 2:
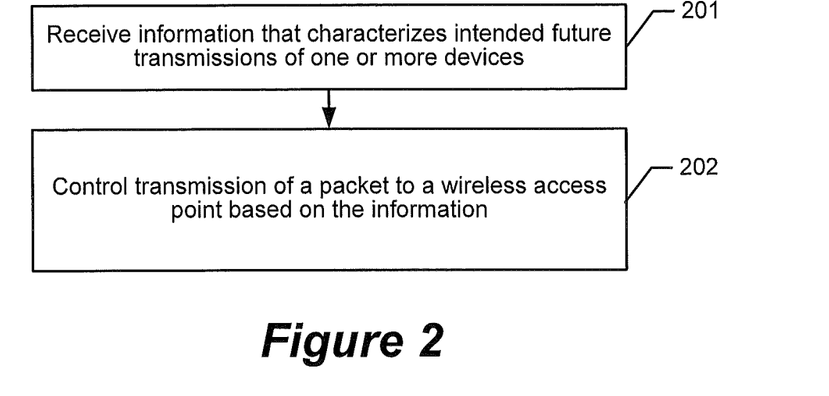
FIGS. 2-12 illustrate operations and method that can be performed by a device for communicating with a wireless access point according to some embodiments.

FIG. 2 illustrates a flowchart of operations and methods by a device, e.g., device 101 of FIG. 1 for communicating with a wireless access point 100. Referring to FIG. 2, the operations and methods may include receiving, at Block 201, information that characterizes intended future transmissions of one or more other devices. The operations and methods further include controlling, at Block 202, transmission of a packet to the wireless access point based on the information. By using information characterizing intended future transmissions of other devices, the devices will try to avoid collisions with other nearby devices. The information that characterizes the intended future transmissions may be directly received from the one or more other devices. The information that characterizes the intended future transmissions of the one or more other devices may be received from the wireless access point.

A potential advantage of this approach is that the device and/or access point may take into consideration the transmission intentions of the other devices before attempting to transmit on the wireless medium. This approach may alleviate collisions experienced by the various devices using the wireless medium, or reduce the time a device must wait before retrying to access the medium. This approach improves the capacity in overlapping networks and in networks with a large number of devices by adding a method for sharing intentions of other devices. More intelligent CSMA timing and/or scheduling of each device may be accomplished.

Figure 3:
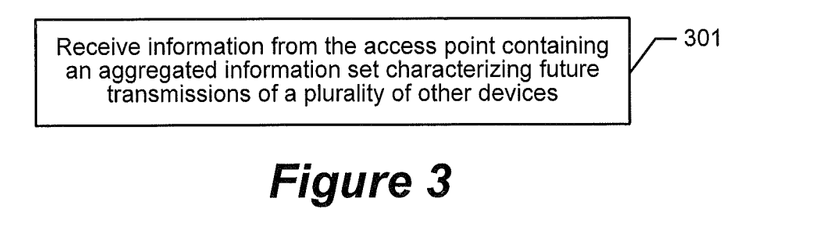

FIG. 3 illustrates a flowchart of operations and methods that may be performed to receive information that characterizes intended future transmission of other devices. Referring to FIG. 3, at Block 301, information may be received from the access point containing an aggregated information set characterizing future transmissions of a plurality of other devices. The information may be aggregated by combining information from a plurality of devices to determine an aggregated set as illustrated in an example in FIG. 17.

Figure 4:
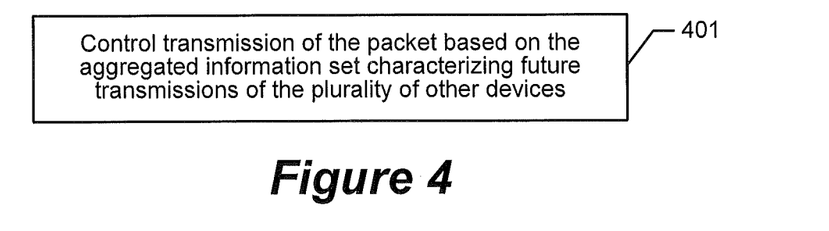

FIG. 4 illustrates a flowchart of operations and methods that may be performed to control transmission of the packet to the wireless access point. Referring to FIG. 4, at Block 401, transmission of the packet maybe controlled based on the aggregated information set characterizing future transmissions of the plurality of other devices. The aggregated information set may be used by the device to transmit a packet under certain conditions such as when buffer capacity of the device is reaching a threshold. When the buffer capacity reaches a threshold, the aggregated information may be considered such that the packet may be successfully transmitted in a short time frame with less chance of collision. Successful transmission in a shorter time frame with less chance of collision may prevent buffer overruns. Buffer overruns, where a buffer exceeds capacity, may be undesirable since there may be consequences such as packet losses. As a packet buffer in a device reaches a threshold, it may be desirable to quickly reduce the number of packets in the buffer by successful transmission of these packets. The device may utilize the aggregated information set for recurring transmissions such video streams, Voice over IP (VoIP) calls, and/or keep-alive messages or upon realization that the communication medium is experiencing a high volume of traffic.

The aggregated information set may include an indication of channels that will be used for future transmission by the plurality of other devices. The intelligent CSMA scheduling afforded by various embodiments described herein allow the addition of channels to the scheduling of the CSMA protocol. The aggregated information set may include an indication of time slots or ranges of time slots that will be used for future transmission by the plurality of other devices. The aggregated information set may include an indication of respective time offsets from a time event that will be used for future transmission by the plurality of other devices. The time offset may be indicated in terms of a measurement of time, such as 10 msec, or as a number of time slots. The time event may be the transmission and/or detection of a packet, an absolute time measurement, and/or determined by a periodic timer.

Figure 5:
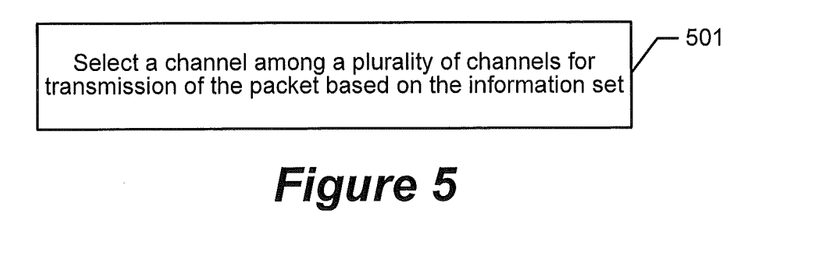

FIG. 5 illustrates a flowchart of operations and methods that may be performed to control transmission of the packet based on the aggregated information set. Referring to FIG. 5, at Block 501, a channel among a plurality of channels may be selected for transmission of the packet based on the information set. A channel may include one or more frequency blocks associated with one or more carrier frequencies. The channel may be selected in order to mitigate the effects of co-channel interference. The channel may be selected to avoid transmission of a packet on channel adjacent to transmissions indicated by the aggregated information set to be planned by other devices. Particular channels may be preferred for specific types of traffic packets such as data packets or control packets in order to prioritize certain types of traffic packets. Channel selection may be based on a statistical algorithm or a desired distribution in relation to the aggregated information set. According to various embodiments, channel selection and/or time slot selection may be based on packet sizes of future transmission of the present device or as indicated by the aggregated information set.

Figure 6:
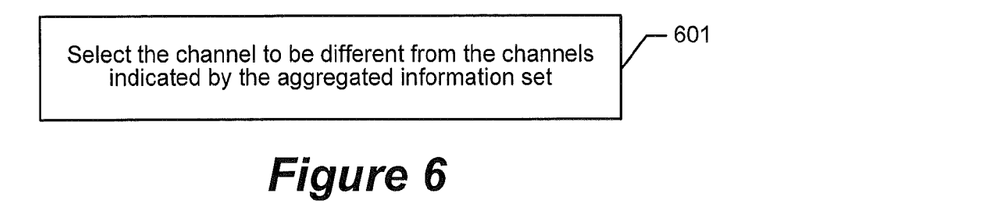

FIG. 6 illustrates a flowchart of operations and methods that may be performed to select a channel based on the aggregated information set. Referring to FIG. 6, at Block 601, a channel may be selected that is different from the channels indicated by the aggregated information set. This different channel may be selected such that multiple devices may transmit on the medium at the same time, but on different frequency channels to prevent interference.

Figure 7:
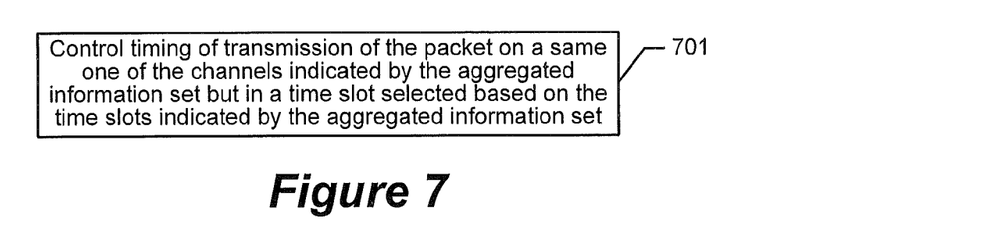

FIG. 7 illustrates a flowchart of operations and methods that may be performed to control transmission of the packet based on the aggregated information set. The aggregated information set may include an indication of time slots that will be used for future transmission by the plurality of other devices. Referring to FIG. 7, at Block 701, the timing of transmission of the packet may be controlled to be on a same one of the channels indicated by the aggregated information set but in a time slot selected based on the time slots indicated by the aggregated information set. According to some embodiments, the channel may be selected to be a channel not in use for a particular time slot.

Figure 8:
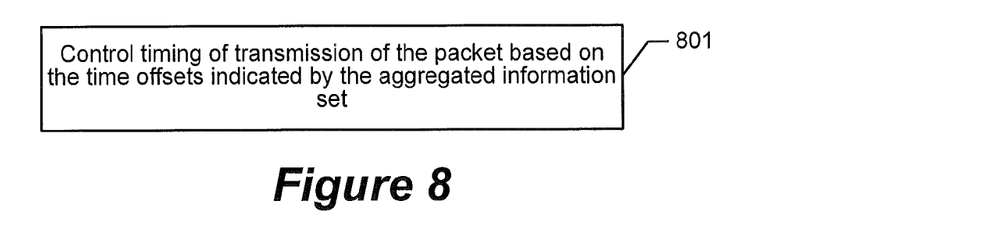

FIG. 8 illustrates a flowchart of operations and methods that may be performed to control transmission of the packet based on the aggregated information set. The aggregated information set may include an indication of respective time offsets from a time event that will be used to control timing of each of the future transmissions by the plurality of other devices. Referring to FIG. 8, at Block 801, the timing of transmission of the packet may be controlled based on the time offsets indicated by the aggregated information set. Time offsets may be determined in relation to an absolute system clock, a time base of the access point, a local time base of the device, and/or in relation to a transmission on the medium.

Figure 9:
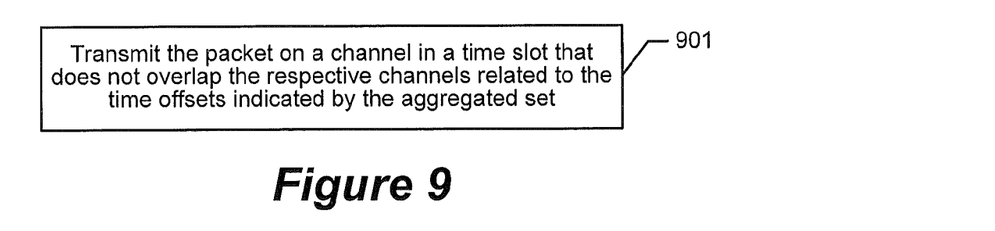

FIG. 9 illustrates a flowchart of operations and methods that may be performed to control transmission of the packet based on the aggregated information set. The aggregated information set may include an indication of respective channels related to time offsets used by each of the future transmissions by the plurality of other devices. Referring to FIG. 9, at Block 901, the packet may be transmitted on a channel in a time slot that does not overlap the respective channels related to the time offsets indicated by the aggregated set. According to some embodiments, packets from different devices may transmit on the medium at the same time on different channels. According to various embodiments, packets from different devices may transmit on the medium using the same channel at different times.

Figure 10:
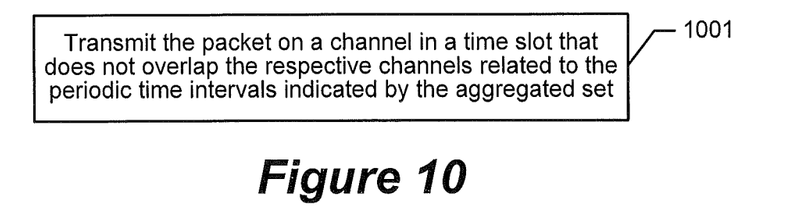

FIG. 10 illustrates a flowchart of operations and methods that may be performed to control transmission of the packet based on the aggregated information set. The aggregated information set characterizing future transmissions may include an indication of periodic time intervals that will be used for future transmission by the plurality of other devices. The aggregated information set may include an indication of respective channels related to the periodic time intervals. Periodic time intervals may be related to types of traffic that may use recurring transmissions such video streams, Voice over IP (VoIP) calls, and/or keep-alive messages. Referring to FIG. 10, at Block 1001, the packet may be transmitted on a channel in a time slot that does not overlap the respective channels related to the periodic time intervals indicated by the aggregated set.

Figure 11:
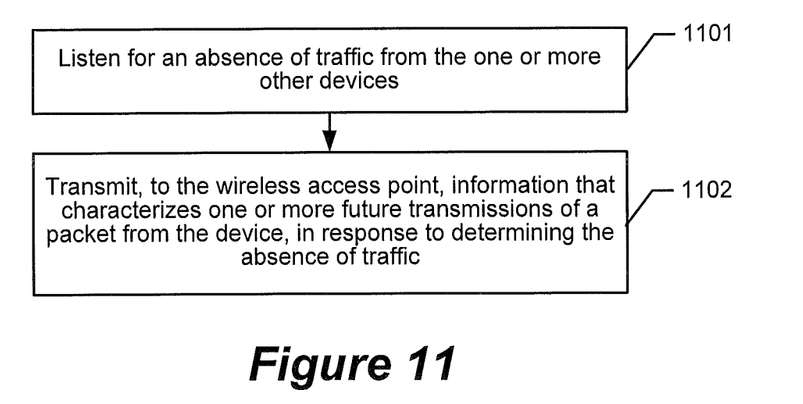

FIG. 11 illustrates a flowchart of operations and methods that may be performed by a device communicating with an access point. Referring to FIG. 11, at Block 1101, the device may listen on the medium for an absence of traffic from the one or more other devices. Listening may include detecting the presence of packets, syncing to pilot signals, and/or measuring signal and/or noise power. Referring to FIG. 11, at Block 1102, the device may transmit to the wireless access point, information that characterizes one or more future transmissions of a packet from the device, in response to determining the absence of traffic. This information may then be available to the access point to aggregate with the information of other devices for indicating to other devices that wish to transmit on the medium. The information characterizing future transmission may be for a single packet, groups of packets, periodic transmission of packets, and/or streams of packets. In the event of a collision of the packet with packets of other devices, a random penalty and/or backoff time may be set before retrying sending the packet on the medium. The backoff time may be expensive in terms of power consumption, latency, and/or capacity.

The device may transmit the information characterizing future transmission under certain conditions such as when the buffer capacity of the device is reaching a threshold, for recurring transmissions such video streams, Voice over IP (VoIP) calls, and/or keep-alive messages, or upon realization that the communication medium is experiencing a high volume of traffic.

Figure 12:
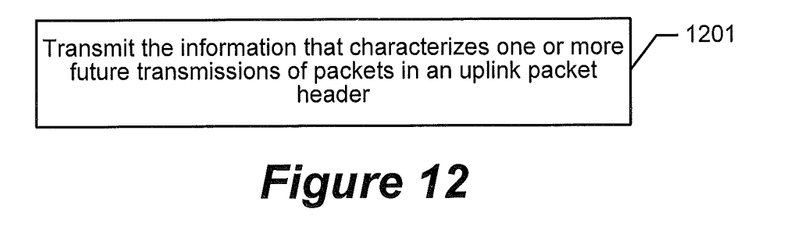

FIG. 12 illustrates a flowchart of operations and methods that may be performed to transmit information that characterizes one or more future transmissions of packets from the device. Referring to FIG. 12, at Block 1201, the information that characterizes one or more future transmissions of packets may be transmitted in an uplink packet header. In some embodiments, the information may be transmitted in a packet footer, as an addendum to the packet, and/or as a separate packet specifically for sending this information to the wireless access point and/or to other devices. The information that characterizes one or more future transmissions of packets may include an indication of a channel in a given time slot in which the one or more future transmissions will occur. The information that characterizes one or more future transmissions of packets may include an indication of a time offset from the present time in which the one or more future transmissions will occur. The information characterizing the one or more future transmissions of packets may include an indication of periodic time intervals in which the one or more future transmissions will occur.

Figure 13:
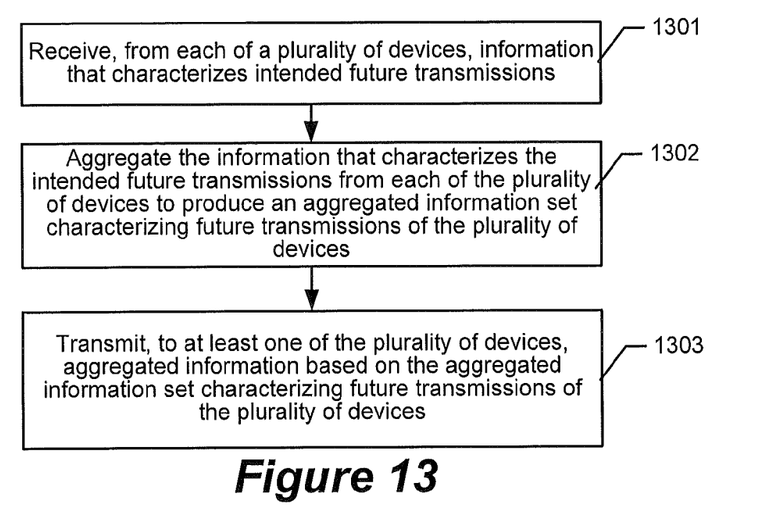
FIGS. 13-16 illustrate operations and methods that can be performed by an access point for controlling access to wireless medium according to some embodiments.

FIG. 13 illustrates a flowchart of operations and methods that may be performed by an access point for controlling access to a wireless medium in a wireless communication network. Referring to FIG. 13, at Block 1301, from each of a plurality of devices, information that characterizes intended future transmissions may be received. Referring to FIG. 13, at Block 1302, the information that characterizes the intended future transmissions from each of the plurality of devices may be aggregated to produce an aggregated information set characterizing future transmissions of the plurality of devices. Referring to FIG. 13, at Block 1303, aggregated information based on the aggregated information set characterizing future transmissions of the plurality of devices may be transmitted to at least one of the plurality of devices. The aggregated information may be transmitted using a downlink packet. The aggregated information may be transmitted in a packet header, packet footer, as an addendum to the packet, and/or as a separate packet specifically for sending this information to other wireless access points and/or to other devices.

Figure 14:
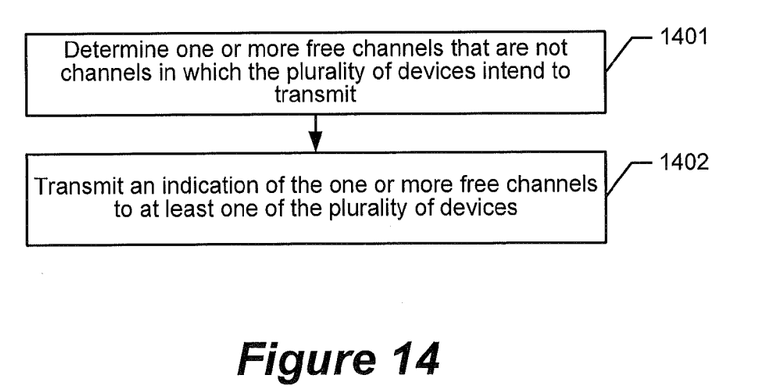

FIG. 14 illustrates a flowchart of operations and methods that may be performed by an access point for transmitting aggregated information. Referring to FIG. 14, at Block 1401, one or more free channels may be determined such that the free channels are not channels in which the plurality of devices intend to transmit. Again referring to FIG. 14, at Block 1402, an indication of the one or more free channels may be transmitted to at least one of the plurality of devices.

Figure 15:
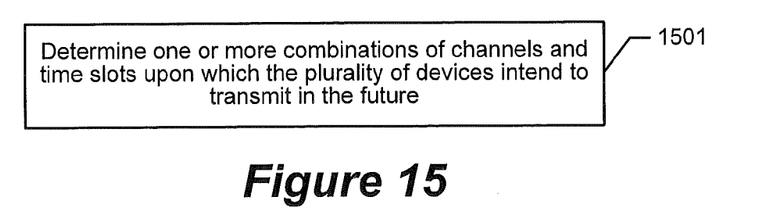

FIG. 15 illustrates a flowchart of operations and methods that may be performed by an access point to aggregate the information. Referring to FIG. 15, at Block 1501, one or more combinations of channels and time slots may be determined, upon which the plurality of devices intend to transmit in the future. The combinations may each include one or more channels and/or one or more timeslots related to the one or more channels. The combinations may include a range of channels, a range of time slots, period time slots, and/or periodic time intervals upon which the devices intend to transmit.

Figure 16:
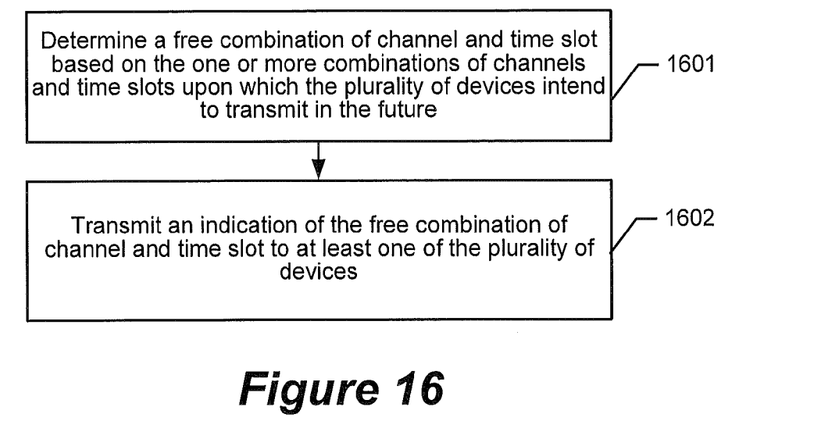

FIG. 16 illustrates a flowchart of operations and methods that may be performed by an access point to transmit the aggregated information. Referring to FIG. 16, at Block 1601, a free combination of channel and time slot may be determined based on the one or more combinations of channels and time slots upon which the plurality of devices intend to transmit in the future. Again referring to FIG. 16, at Block 1602, an indication of a free combination of channel and time slot may be transmitted to at least one of the plurality of devices. According to various embodiments, the device may receive the channels and/or time slots upon which the device may transmit the packet. According to some embodiments, the device may receive the channels and/or time slots intended to be used by the other devices. In this case the device may decide the channels and/or time slots upon which it may transmit.

Figure 17:
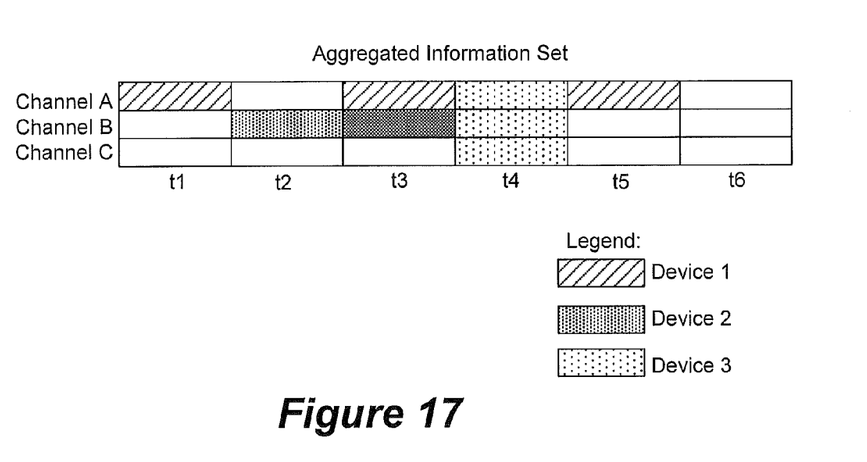
FIG. 17 illustrates an aggregated information set according to some embodiments.

FIG. 17 illustrates an aggregated information set according to some embodiments. In this example, three devices, Device 1, Device 2, and Device 3 send information that characterizes future transmissions to an access point. The information may include channel and/or time slot information. The access point aggregates the information from the three devices to produce an aggregated information set that includes channels and/or timeslot combinations that are intended to be used. This aggregated information set may be transmitted to a device for consideration before transmitting a packet.

Figure 18:
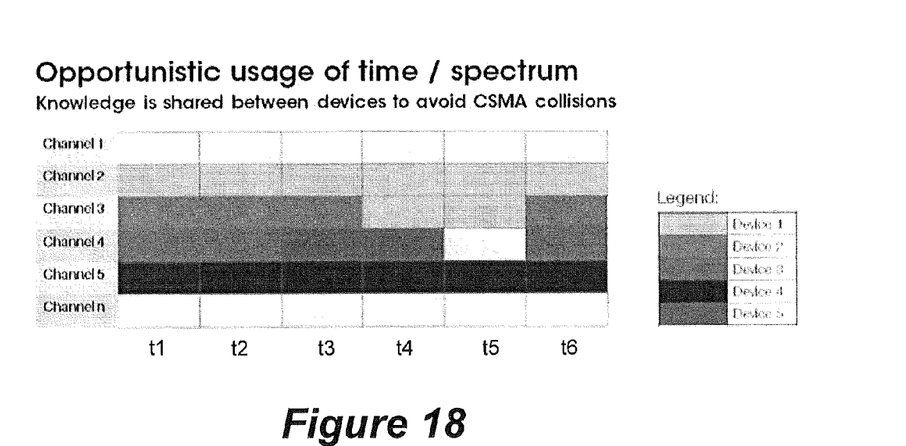
FIG. 18 illustrates an opportunistic usage of time and channels of the wireless medium according to some embodiments.

FIG. 18 illustrates an opportunistic usage of timeslots and channels of the wireless medium according to some embodiments. In this example five devices, Devices 1-5, are scheduled in non-overlapping channels and timeslots such that collisions of packets between these five devices will not occur.

Figure 19:
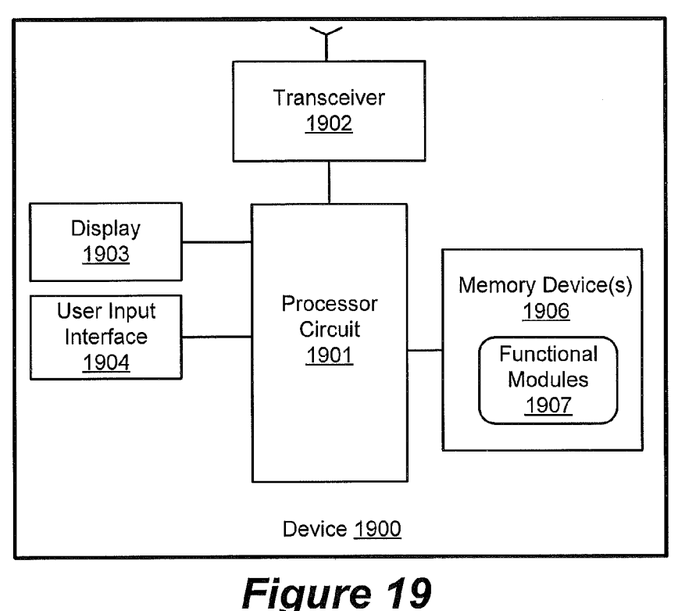
FIG. 19 illustrates a device that may be configured to operate according to one or more embodiments disclosed herein.

Example Device:

FIG. 19 is a block diagram of a device 1900 that is configured according to one or more embodiments disclosed herein for a device 101 of FIG. 1. The device 1900 includes a transceiver 1902, a processor circuit(s) 1901, and a memory device(s) 1906 containing functional modules 1907. The device 1900 may further include a display 1903, and a user input interface 1904.

The transceiver 1902 is configured to communicate with an access point through a wireless air interface using one or more of the radio access technologies. The processor circuit 1901 may include one or more data processing circuits, such as a general purpose and/or special purpose processor, e.g., microprocessor and/or digital signal processor. The processor circuit 1901 is configured to execute computer program instructions from the functional modules 1907 of the memory device(s) 1906 to perform at least some of the operations and methods described herein as being performed by a device 101 of FIG. 1.

Figure 20:
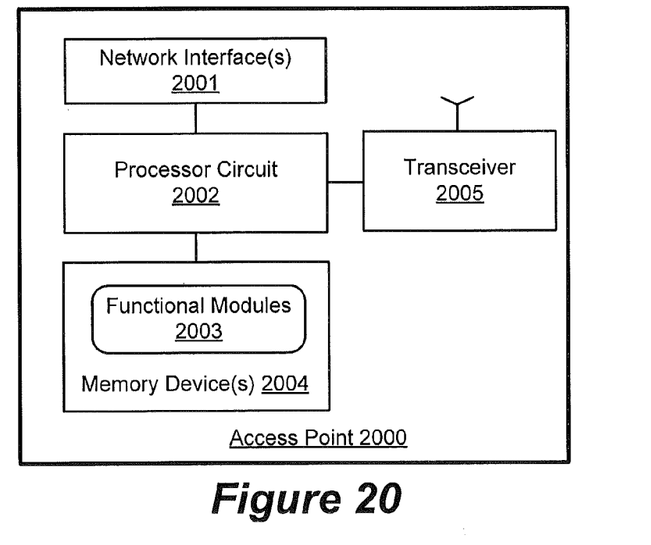
FIG. 20 illustrates an access point that may be configured to operate according to one or more embodiments disclosed herein.

Example Access Point:

FIG. 20 is a block diagram of an access point 2000 that is configured according to one or more embodiments disclosed herein. The access point 2000 includes a transceiver 2005, a network interface(s) 2001, a processor circuit 2002, and a memory device(s) 2004 containing functional modules 2003.

The transceiver 2005 is configured to communicate with the device 1900 using one or more of the radio access technologies. The processor circuit 2002 may include one or more data processing circuits, such as a general purpose and/or special purpose processor, e.g., microprocessor and/or digital signal processor, that may be collocated or distributed across one or more networks. The processor circuit 2002 is configured to execute computer program instructions from the functional modules 2003 of the memory device(s) 2004 to perform at least some of the operations and methods of described herein as being performed by an access point. The network interface 2001 communicates with other access points and/or a core network.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a device is referred to as being "connected", "coupled", "responsive", or variants thereof to another node, it can be directly connected, coupled, or responsive to the other node or intervening nodes may be present. In contrast, when an device is referred to as being "directly connected", "directly coupled", "directly responsive", or variants thereof to another node, there are no intervening devices present. Like numbers refer to like devices throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blue Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method by a device of communicating with a wireless access point, the method comprising:
receiving information from the wireless access point that characterizes intended future transmissions of one or more other devices other than the device and other than the wireless access point, wherein the information comprises an aggregated information set indicating time slots that will be used for future transmission by the one or more other devices; and
controlling transmission of a packet by the device directly to the wireless access point based on the aggregated information set, wherein the controlling transmission comprises controlling timing of transmission of the packet on a same one of the channels indicated by the aggregated information set but in a time slot selected based on the time slots indicated by the aggregated information set.

2. The method of claim 1, wherein the information that characterizes the intended future transmissions is directly received from the one or more other devices.

3. The method of claim 1, wherein the information that characterizes the intended future transmissions of the one or more other devices other than the device and other than the wireless access point is received from the wireless access point.

4. The method of claim 1, wherein:
the aggregated information set comprises an indication of channels that will be used for future transmission by the one or more other devices; and
the controlling transmission of the packet based on the aggregated information set, comprises selecting a channel among a plurality of channels for transmission of the packet based on the aggregated information set.

5. The method of claim 4, wherein the selecting the channel among the plurality of channels for transmission of the packet based on the aggregated information set, comprises selecting the channel to be different from the channels indicated by the aggregated information set.

6. The method of claim 1, wherein:
the aggregated information set comprises an indication of respective time offsets from a time event that will be used to control timing of each of the future transmissions by the one or more other devices; and
the controlling transmission of the packet based on the aggregated information set, comprises controlling timing of transmission of the packet based on the time offsets indicated by the aggregated information set.

7. The method of claim 6, wherein:
the aggregated information set further comprises an indication of respective channels related to time offsets used by each of the future transmissions by the one or more other devices, and
the controlling transmission of the packet based on the aggregated information set, comprises transmitting the packet on a channel in a time slot that does not overlap the respective channels related to the time offsets indicated by the aggregated set.

8. The method of claim 1, wherein the aggregated information set includes an indication of periodic time intervals that will be used for future transmission by the one or more other devices.

9. The method of claim 8, wherein:
the aggregated information set further comprises an indication of respective channels related to the periodic time intervals, and
the controlling transmission of the packet based on the aggregated information set, comprises transmitting the packet on a channel in a time slot that does not overlap the respective channels related to the periodic time intervals indicated by the aggregated set.

10. The method of claim 1, further comprising:
listening for an absence of traffic from the one or more other devices; and transmitting, to the wireless access point, information that characterizes one or more future transmissions of a packet from the device, in response to determining the absence of traffic.

11. The method of claim 10, wherein the transmitting information that characterizes one or more future transmissions of packets from the device comprises:

transmitting the information that characterizes one or more future transmissions of packets in an uplink packet header.

12. The method of claim 10, wherein the information that characterizes one or more future transmissions of packets comprises an indication of a channel in a given time slot in which the one or more future transmissions will occur.

13. The method of claim 10, wherein the information that characterizes one or more future transmissions of packets comprises an indication of a time offset from the present time in which the one or more future transmissions will occur.

14. The method of claim 10, wherein the information characterizing the one or more future transmissions of packets comprises an indication of periodic time intervals in which the one or more future transmission will occur.

15. The method of claim 10, wherein the listening for an absence of traffic from the one or more other devices and the transmitting the information that characterizes one or more future transmissions are based on carrier sense multiple access (CSMA) protocol.

16. A device for communicating with a wireless access point, the device comprising:

a receiver configured to receive information from the wireless access point that characterizes intended future transmissions of one or more other devices other than the device and other than the wireless access point, wherein the information comprises an aggregated information set indicating time slots that will be used for future transmission by the one or more other devices; and a processor configured to control transmission of a packet by the device directly to the wireless access point based on the aggregated information set by controlling timing of transmission of the packet on a same one of the channels indicated by the aggregated information set but in a time slot selected based on the time slots indicated by the aggregated information set.

17. The device of claim 16, wherein the information that characterizes the intended future transmissions is directly received from the one or more other devices.

\* \* \* \* \*